(12) United States Patent
Baccouche et al.

(10) Patent No.: US 10,155,548 B2
(45) Date of Patent: Dec. 18, 2018

(54) VEHICLE STRUCTURE INCLUDING REINFORCEMENT EXTENDING BETWEEN ROCKERS

(71) Applicant: Ford Global Technologies, LLC, Dearborn, MI (US)

(72) Inventors: Mohamed Ridha Baccouche, Ann Arbor, MI (US); Saeed David Barbat, Novi, MI (US); Rahul Arora, Birmingham, MI (US); Saied Nusier, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 32 days.

(21) Appl. No.: 15/458,388

(22) Filed: Mar. 14, 2017

(65) Prior Publication Data

US 2018/0265136 A1    Sep. 20, 2018

(51) Int. Cl.
| | |
|---|---|
| *B62D 25/20* | (2006.01) |
| *B62D 21/15* | (2006.01) |
| *B62D 25/02* | (2006.01) |
| *B60J 5/04* | (2006.01) |
| *B62D 27/02* | (2006.01) |
| *B60N 2/01* | (2006.01) |
| *B60N 2/06* | (2006.01) |
| *B60N 2/14* | (2006.01) |
| *B60N 2/02* | (2006.01) |

(52) U.S. Cl.
CPC ........ *B62D 25/2036* (2013.01); *B60J 5/0479* (2013.01); *B60N 2/012* (2013.01); *B60N 2/0232* (2013.01); *B60N 2/062* (2013.01); *B60N 2/143* (2013.01); *B62D 21/157* (2013.01); *B62D 25/025* (2013.01); *B62D 25/2009* (2013.01); *B62D 27/02* (2013.01)

(58) Field of Classification Search
CPC ...... B60N 2/015; B60N 2/012; B62D 25/025; B62D 25/20; B62D 25/2009; B62D 25/2036
USPC ............ 296/65.11, 187.08, 187.12, 204, 209
See application file for complete search history.

(56) References Cited

U.S. PATENT DOCUMENTS

| | | | | |
|---|---|---|---|---|
| 2,187,936 | A * | 1/1940 | Craig ...................... | E05B 83/36 16/86 C |
| 2,194,601 | A * | 3/1940 | Kuethe ................ | E05B 63/248 292/224 |

(Continued)

OTHER PUBLICATIONS

Future Timeline.net, "A shape-shifting, self-driving concept car by Nissan," www.futuretimeline.net/blog/2015/11/3.htm#. WFOU8GR952S; Nov. 3, 2015; 6 pages.

(Continued)

*Primary Examiner* — Jason S Daniels
(74) *Attorney, Agent, or Firm* — Jason Rogers; Bejin Bieneman PLC (57) ABSTRACT

A vehicle structure including a first rocker, a second rocker, and a reinforcement. The first rocker is spaced from the second rocker. The reinforcement has a forward beam and a rearward beam spaced from each other. The reinforcement includes a first side member and a second side member each extending from the forward beam to the rearward beam. The first side member abuts the first rocker, and the second side member abuts the second rocker.

21 Claims, 5 Drawing Sheets

(56) References Cited

U.S. PATENT DOCUMENTS

| | | | | |
|---|---|---|---|---|
| 2,204,208 A * | 6/1940 | Craig | ............ | E05B 77/54 16/86 C |
| 2,210,230 A * | 8/1940 | Craig | ............ | E05B 77/54 16/82 |
| 2,211,257 A * | 8/1940 | Deisley | ............ | B60J 5/0405 49/489.1 |
| 2,244,441 A * | 6/1941 | Arrizabala | ............ | E05B 77/46 70/240 |
| 2,438,238 A * | 3/1948 | Tonkin | ............ | E05B 77/52 292/182 |
| 2,450,372 A * | 9/1948 | Craig | ............ | E05B 77/46 180/281 |
| 6,027,170 A | 2/2000 | Benz et al. | | |
| 8,398,158 B2 | 3/2013 | Mildner et al. | | |
| 9,108,682 B2 * | 8/2015 | Mori | ............ | B62D 21/157 |
| 9,428,276 B1 | 8/2016 | Marini et al. | | |
| 9,459,622 B2 | 10/2016 | Abhyanker | | |
| 2003/0141736 A1 | 7/2003 | Chernoff et al. | | |
| 2006/0097502 A1 | 5/2006 | Bingham et al. | | |
| 2012/0032466 A1 * | 2/2012 | Line | ............ | B60N 2/062 296/65.12 |
| 2012/0068499 A1 | 3/2012 | Mildner et al. | | |
| 2013/0057014 A1 * | 3/2013 | Endt | ............ | B60N 2/0745 296/65.11 |
| 2014/0175249 A1 * | 6/2014 | Becker | ............ | B21D 19/08 248/429 |
| 2014/0246559 A1 * | 9/2014 | Landskron | ............ | B60N 2/0232 248/674 |
| 2015/0142273 A1 | 5/2015 | Cuddihy et al. | | |
| 2016/0059752 A1 * | 3/2016 | Kishida | ............ | F16H 57/039 297/344.12 |
| 2016/0264021 A1 | 9/2016 | Gillett | | |
| 2017/0267126 A1 * | 9/2017 | Reuschel | ............ | B60N 2/074 |

OTHER PUBLICATIONS

Mercedes-Benz, "The Mercedes-Benz F 015 Luxury in Motion," www.mercedes-benz.com/en/mercedes-benz/innovation/research-vehicle-f-015-luxury-in-motion/; Dec. 16, 2016; 6 pages.

* cited by examiner

VEHICLE STRUCTURE INCLUDING REINFORCEMENT EXTENDING BETWEEN ROCKERS

BACKGROUND

A vehicle may include a vehicle body defining a plurality of door openings. The vehicle body may include a roof, a floor, and a plurality of pillars. The pillars may be spaced from each other by the door openings. In other words, the pillars may be disposed on opposite sides of the door openings. Typically, the pillars include a B-pillar separating two door openings and extending from the floor to the roof of the vehicle. The pillars also include an A-pillar and a C-pillar spaced from the B-pillar on opposite sides of the door openings.

DETAILED DESCRIPTION

A vehicle structure of a vehicle includes a first rocker, a second rocker spaced from the first rocker, and a reinforcement. The reinforcement includes a forward beam and a rearward beam spaced from each other. The reinforcement includes a first side member and a second side member each extending from the forward beam to the rearward beam. The first side member abuts the first rocker, and the second side member abuts the second rocker.

The vehicle structure may include a first pillar and a second pillar spaced from each other. The first pillar and the second pillar may define a door opening therebetween. The door opening may be sized to receive a front door and a rear door. The reinforcement may be disposed between the first pillar and the second pillar.

The vehicle structure may include an underbody and a floor spaced from each other. The underbody may extend from the first rocker to the second rocker. The reinforcement may be disposed between the underbody and the floor. The reinforcement may abut the underbody.

The vehicle structure may include a bulkhead and a cross member spaced from each other, and each extending from the first rocker to the second rocker. The forward beam may abut the bulkhead and the rearward beam may abut the cross member. The reinforcement may include a flange fixed to the rearward beam. The flange may extend across the cross member and may be fixed to the cross member.

The first side member may be elongated along the first rocker, and the second side member may be elongated along the second rocker. The first side member may be fixed to the first rocker, and the second side member may be fixed to the second rocker.

The forward beam and the rearward beam may each have a convex shape from the first side member to the second side member. The forward beam may include a first segment extending from the first side member at a non-perpendicular angle, and a second segment extending from the second side member at a non-perpendicular angle. The first segment and the second segment may each extend from the first side member and second side member, respectively, in directions transverse to each other. The forward beam may include an intermediate segment extending from the first segment to the second segment. Each of the first segment and the second segment of the forward beam may extend transversely from the intermediate segment. The intermediate segment may be elongated in a direction perpendicular to the first rocker and the second rocker. The rearward beam may be a mirror image of the forward beam.

The reinforcement may include a track extending along the forward beam and the rearward beam. The reinforcement may support a seat assembly movably coupled to the track. A motor may moveably couple the seat assembly to the track. The track may be continuous and extend along the first side member and the second side member.

The reinforcement may include an inner wall and an outer wall spaced from the inner wall. The inner wall and the outer wall may define a groove therebetween. The reinforcement may support the seat assembly slideably engaged with the groove.

With reference to the Figures, wherein like numerals indicate like parts throughout the several views, the vehicle is generally shown. During a vehicle impact, e.g., a side impact, a front impact, a rear impact, etc., the vehicle structure 10 may be impacted and be biased toward an occupant compartment of the vehicle 12. When the vehicle structure 10 is impacted, the reinforcement 14 distributes the force of the impact to assist in absorbing the energy of the vehicle impact and reducing intrusion into the occupant compartment. Since the reinforcement 14 abuts the first rocker 16 and the second rocker 18, the first side member 20 and the second side member 22 reinforce the first rocker 16 and the second rocker 18. Since the reinforcement 14 extends from the first rocker 16 to the second rocker 18, the forward beam 24 and the rearward beam 26 also reinforce the first rocker 16 and the second rocker 18. Specifically, when one of the first rocker 16 and the second rocker 18 is impacted, the impacted one of the first side member 20 and the second side member 22 absorbs the forces of the vehicle impact. In this situation, the forward beam 24 and/or the rearward beam 26 distribute the forces to the other of the first rocker 16 and the second rocker 18 such that the other of the first rocker 16 and the second rocker 18 reinforces the impacted one of the first rocker 16 and the second rocker 18. Further, because the forward beam 24 and the rearward beam 26 each abut other vehicle components, as set forth below, the first side member 20 and the second side member 22 may reinforce the vehicle structure 10 during the vehicle impact. By reinforcing the vehicle structure 10, the reinforcement 14 may allow for the elimination of a pillar, typically referred to as a B-pillar. For example, the vehicle 12 shown in FIGS. 1-4 does not include a B-pillar. The absence of this pillar may assist with the ingress and/or egress of an occupant into and out of the vehicle 12. The absence of this pillar, for example, may be useful in an autonomous vehicle.

The vehicle 12 may, for example, be any suitable type of automobile. The vehicle 12 may include two sides 88, 90 spaced from each other along a lateral axis A, i.e., in a cross-vehicle direction. The vehicle 12 may include a longitudinal axis L extending transverse to the lateral axis A, i.e., in a vehicle fore-and-aft direction. The two sides 88, 90 of the vehicle 12 may extend transverse to the lateral axis A. For example, the two sides 88, 90 may each be elongated along the longitudinal axis L.

Each side 88, 90 of the vehicle 12 may be similar or identical to each other. For example, as shown in the Figures, each side 88, 90 includes one first pillar 28, one second pillar 30, one door opening 32, one rocker, etc. Common numerals are used to identify common features on each side 88, 90 of the vehicle 12. The two sides 88, 90 of the vehicle 12 may be mirror images of each other about the longitudinal axis L, as shown in the Figures.

The vehicle structure 10 includes a body 34 and the reinforcement 14 connected to the body 34. The body 34 may be of a unibody construction. In the unibody construction, the body 34, e.g., the rockers, serves as the vehicle frame, and the body 34 (including the rockers, pillars, roof rails, etc.) is unitary, i.e., a continuous one-piece unit. As another example, the vehicle 12 may have a body-on-frame construction (also referred to as a cab-on-frame construction). In other words, the body 34 is mounted on a frame of the vehicle 12, and the body 34 and the frame are separate components, i.e., are modular. In the body-on-frame configuration, the body 34 is supported on and affixed to the frame. Alternatively, the body 34 may have any suitable construction. The body 34 may be formed of any suitable material, for example, steel, aluminum, etc.

Figure 1:
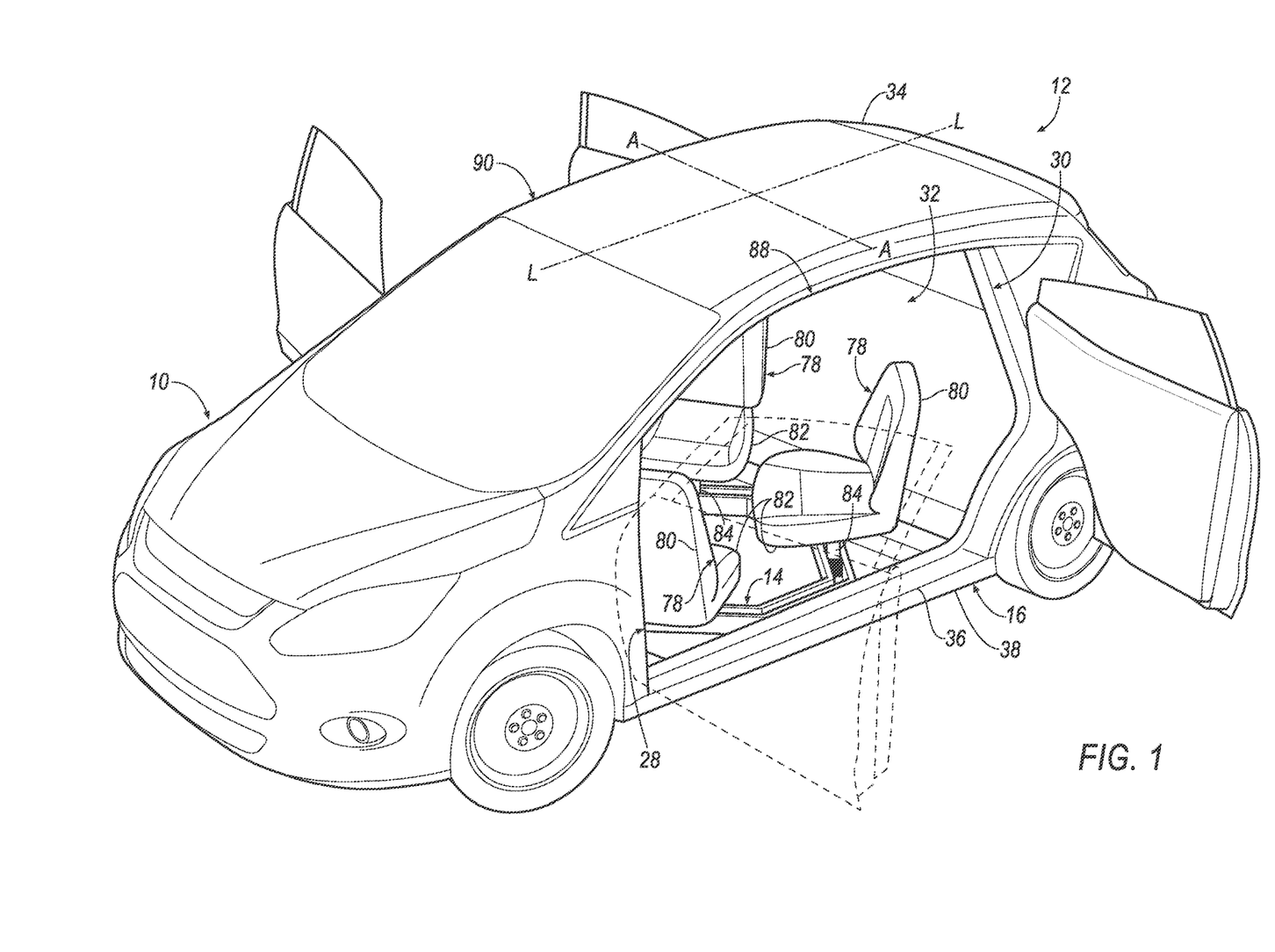
FIG. 1 is a perspective view of a vehicle including a first pillar and a second pillar defining a door opening therebetween sized to receive a front door and a rear door.

With reference to FIG. 1, the body 34 may include the first pillar 28 and the second pillar 30 spaced from each other along the longitudinal axis L. The first pillar 28 and the second pillar 30 may define the door opening 32 therebetween. In other words, the first pillar 28 and the second pillar 30 may be disposed on opposite sides of the door opening 32. The door opening 32 may be sized to receive the front door and the rear door. For example, the first pillar 28 may be an A-pillar and the second pillar 30 may be a C-pillar spaced from the A-pillar on the opposite side of the door opening 32. In this configuration, as shown in the Figures, the vehicle 12 does not include a middle pillar, i.e., a B-pillar, between the first pillar 28 and the second pillar 30. Alternatively, the door opening 32 may be sized to receive one of the front door and the rear door. In this situation, the first pillar 28 may be the A-pillar, and the second pillar 30 may be a B-pillar spaced from the A-pillar one the opposite side of the door opening 32.

Figure 2:
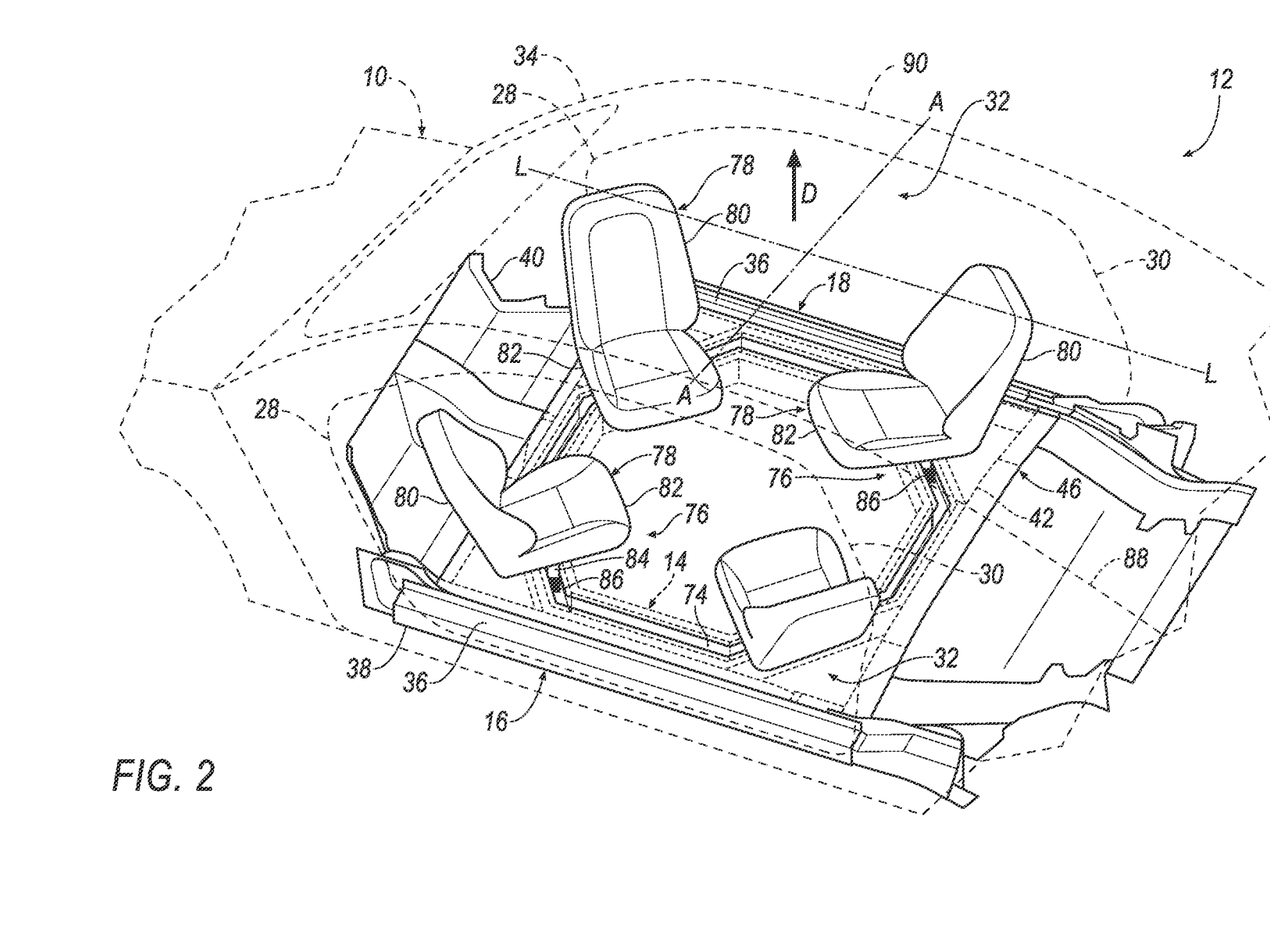
FIG. 2 is a perspective view of the vehicle having a vehicle structure including a reinforcement and a plurality of seat assemblies supported by the reinforcement.

With continued reference to FIG. 2, the first rocker 16 is spaced from the second rocker 18, as set forth above, along the lateral axis A. For example, the first rocker 16 may be disposed on one side 88 of the vehicle 12 and the second rocker 18 may be disposed on the other side 90 of the vehicle 12. In other words, the first rocker 16 and the second rocker 18 may each be spaced from the longitudinal axis L of the vehicle 12.

With continued reference to FIG. 2, the first rocker 16 may be elongated along the longitudinal axis L. For example, the first rocker 16 may extend from the first pillar 28 to the second pillar 30 on one side 88 of the vehicle 12. The first rocker 16 may intersect each of the first pillar 28 and the second pillar 30 along the longitudinal axis L. The first rocker 16 may be fixed to the first pillar 28 and the second pillar 30 of the first side. The first rocker 16 may, for example, partially define the door opening 32 on one side 88 of the vehicle 12.

With continued reference to FIG. 2, the second rocker 18 may be elongated along the longitudinal axis L. For example, the second rocker 18 may extend from the first pillar 28 to the second pillar 30 on the other side 90 of the vehicle 12. The second rocker 18 may intersect each of the first pillar 28 and the second pillar 30 along the longitudinal axis L. The second rocker 18 may be fixed to the first pillar 28 and the second pillar 30 of the second side. The second rocker 18 may, for example, partially define the door opening 32 on the other side 90 of the vehicle 12.

Each rocker may include a top 36 and a bottom 38 spaced from each other. The top 36 and the bottom 38 may be spaced from each other in a direction D transverse to both the longitudinal axis L and the lateral axis A. For example, the top 36 may be adjacent the door opening 32, and the bottom 38 may be spaced from the door opening 32 by the top 36 of the rocker.

Figure 3:
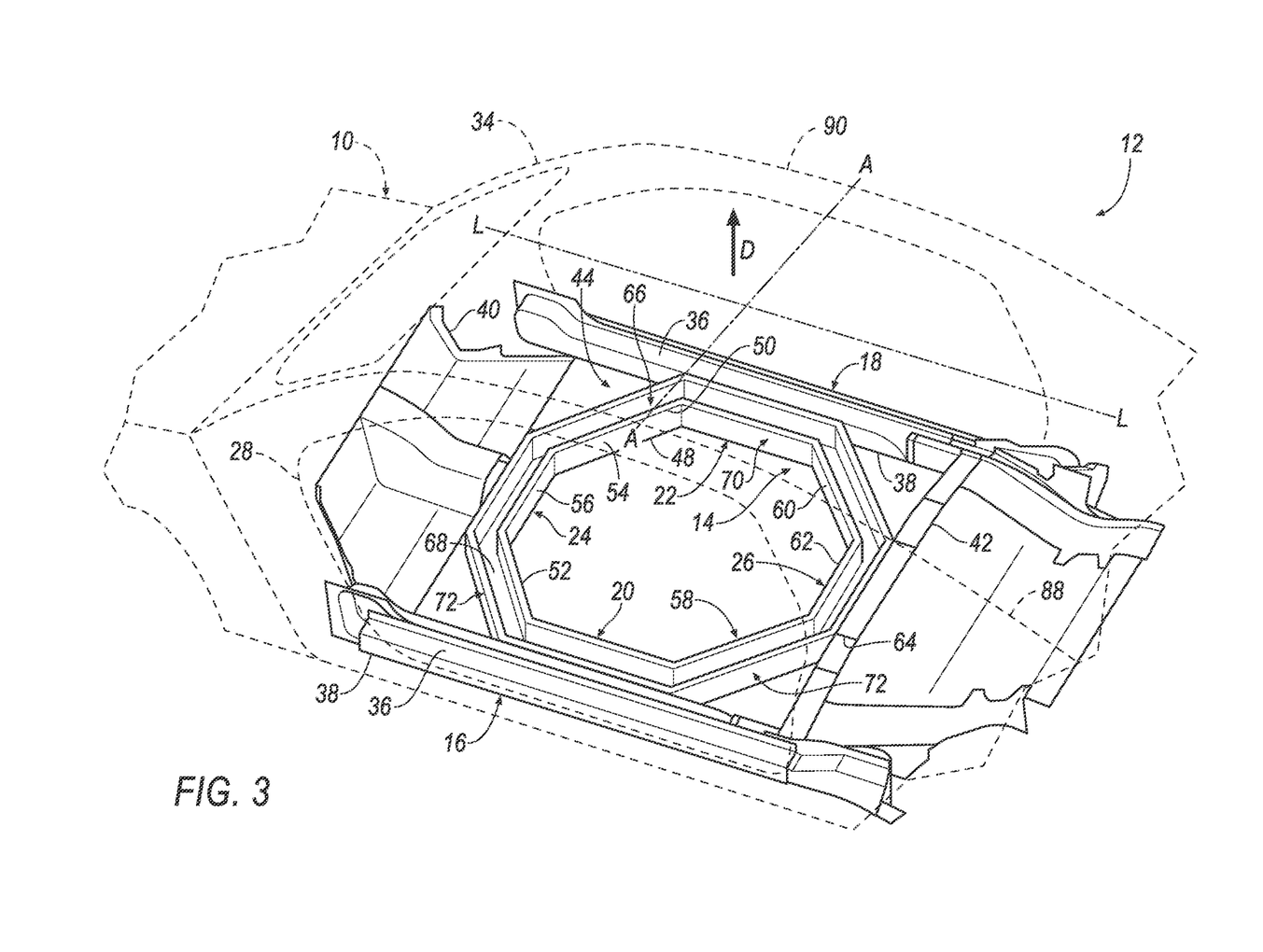
FIG. 3 is a perspective view of the vehicle including the reinforcement having a first side member and a second side member spaced from each other, with the first side member abutting a first rocker and the second side member abutting a second rocker.

With reference to FIG. 3, the body 34 may include the bulkhead 40 and the cross member 42 spaced from each other along the longitudinal axis L. The bulkhead 40 may extend from the first rocker 16 to the second rocker 18, i.e., along the lateral axis A. The bulkhead 40 may, for example, be disposed adjacent the first pillar 28 on each side 88, 90 of the vehicle 12. The bulkhead 40 may support a plurality of vehicle components, e.g., an instrument panel, an accelerator pedal, a brake pedal, etc.

With continued reference to FIG. 3, the cross member 42 may extend from the first rocker 16 to the second rocker 18, i.e., along the lateral axis A. The cross member 42 may be disposed along the longitudinal axis L between the first pillar 28 and the second pillar 30 of the first side, and between the first pillar 28 and the second pillar 30 of the second side. For example, the cross member 42 may be disposed adjacent the second pillar 30 on each side 88, 90 of the vehicle 12. The cross member 42 may be disposed at any suitable position between the first pillar 28 and the second pillar 30.

The body 34 may include the underbody 44 extending from the first rocker 16 to the second rocker 18 along the lateral axis A, as shown in FIG. 3. In other words, the underbody 44 may extend from one side 88 of the vehicle 12 to the other side 90 of the vehicle 12. The underbody 44 may be, for example, co-planar with the bottom 38 of the first rocker 16 and the bottom 38 of the second rocker 18. In other words, the underbody 44 may extend from the bottom 38 of the first rocker 16 to the bottom 38 of the second rocker 18. Additionally, the underbody 44 may extend from the cross member 42 to the bulkhead 40 along the longitudinal axis L, as shown in FIG. 3.

The underbody 44 may be fixed to both rockers, i.e., the first rocker 16 and the second rocker 18, the cross member 42, and the bulkhead 40. The underbody 44 may be fixed to both rockers, i.e., the first rocker 16 and the second rocker 18, the cross member 42, and the bulkhead 40 in any suitable manner, e.g., welding, fastening, adhesive, etc.

The underbody 44 may be panel-shaped. The underbody 44 may be a single continuous unit, e.g., initially formed as a single piece of metal. As another example, the underbody 44 may include a plurality of segments, i.e., two or more, that are separately formed and subsequently attached together, e.g., by welding.

The reinforcement 14 may be disposed between the underbody 44 and the floor 46, as set forth below. Specifically, the reinforcement 14 may abut the underbody 44.

Additionally, the reinforcement 14 may be disposed between the first pillar 28 and the second pillar 30, as shown in the Figures. For example, the forward beam 24 and the rearward beam 26 may both be disposed in the door opening 32. In other words, the reinforcement 14 may be disposed in the door opening 32.

The reinforcement 14 may be fixed to the underbody 44. The reinforcement 14 may be fixed to the underbody 44 in any suitable manner. For example, the reinforcement 14 may be welded to the underbody 44. Alternatively, the reinforcement 14 may be fixed to the underbody 44 by fastening, adhesive, etc. The reinforcement 14 may be formed of any suitable material, e.g., steel, aluminum, etc.

With reference to FIG. 3, the reinforcement 14 may include a bottom 48 abutting the underbody 44 and a top 50 spaced from the bottom 48. The reinforcement 14 may, for example extend from the bottom 48 to the top 50. The top 50 of the reinforcement 14 may be disposed at any suitable position between the bottom 48 of the reinforcement 14 and the floor 46. For example, the top 50 of the reinforcement 14 may abut the floor 46. Alternatively, the top 50 of the reinforcement 14 may be adjacent the floor 46, i.e., spaced from the floor 46. Both the top 50 and the bottom 48 of the reinforcement 14 may be continuous and extend along the reinforcement 14.

With reference to FIG. 3, the first side member 20 may be disposed on one side 88 of the vehicle 12. For example, the first side member 20 may be disposed between the first pillar 28 and the second pillar 30, i.e., in the door opening 32, on one side 88 of the vehicle 12. In other words, the first side member 20 may be disposed adjacent the first rocker 16. Specifically, the first side member 20 may abut the first rocker 16, as set forth above. The first side member 20 may be elongated along the first rocker 16, i.e., along the longitudinal axis L.

The first side member 20 may be fixed to the first rocker 16. The first side member 20 may be fixed to the first rocker 16 in any suitable manner. For example, the first side member 20 may be fixed to the first rocker 16 by welding. Alternatively, the first side member 20 may be fixed to the first rocker 16 by fastening, adhesive, etc.

With reference to FIG. 3, the second side member 22 may be disposed on the other side 90 of the vehicle 12. For example, the second side member 22 may be disposed between the first pillar 28 and the second pillar 30, i.e., in the door opening 32, on the other side 90 of the vehicle 12. In other words, the second side member 22 may be disposed adjacent the second rocker 18. Specifically, the second side member 22 may abut the second rocker 18, as set forth above. The second side member 22 may be elongated along the second rocker 18, i.e., along the longitudinal axis L.

The second side member 22 may be fixed to the second rocker 18. The second side member 22 may be fixed to the second rocker 18 in any suitable manner. For example, the second side member 22 may be fixed to the second rocker 18 by welding. Alternatively, the second side member 22 may be fixed to the second rocker 18 by fastening, adhesive, etc.

With reference to FIG. 3, the forward beam 24 may extend from one side 88 of the vehicle 12 to the other side 90 of the vehicle 12, i.e., along the lateral axis A. For example, the forward beam 24 may extend from the first side member 20 to the second side member 22. Additionally, the forward beam 24 may abut the bulkhead 40. The forward beam 24 may be fixed to the bulkhead 40. The forward beam 24 may be fixed to the bulkhead 40 in any suitable manner, e.g., welding, fastening, adhesive, etc.

The forward beam 24 may have a convex shape from the first side member 20 to the second side member 22, i.e., towards the lateral axis A. For example, the first side member 20 and the second side member 22 may each be spaced from the bulkhead 40. In this situation, the forward beam 24 may extend from the first side member 20 to the bulkhead 40 and from the second side member 22 to the bulkhead 40.

With continued reference to FIG. 3, the forward beam 24 may include the first segment 52 extending from the first side member 20 at the non-perpendicular angle, and the second segment 54 extending from the second side member 22 at the non-perpendicular angle. The first segment 52 and the second segment 54 of the forward beam 24 may each extend from the first side member 20 and the second side member 22, respectively, in directions transverse to each other. The first segment 52 may extend, for example, obliquely from the first side member 20 towards the bulkhead 40, and the second segment 54 may extend, for example, obliquely from the second side member 22 towards the bulkhead 40. In other words, the first segment 52 and the second segment 54 may extend from the first side member 20 and the second side member 22, respectively, towards each other, i.e., towards the longitudinal axis L. Each of the first segment 52 and the second segment 54 may extend at any suitable non-perpendicular angle from the first side member 20 and the second side member 22, respectively, towards the bulkhead 40.

With continued reference to FIG. 3, the forward beam 24 may include the intermediate segment 56 extending from the first segment 52 to the second segment 54 of the forward beam 24. Each of the first segment 52 and the second segment 54 of the forward beam 24 may extend transversely from the intermediate segment 56 of the forward beam 24. For example, the first segment 52 and the second segment 54 of the forward beam 24 may each extend obliquely from the intermediate segment 56 of the forward beam 24 to the first side member 20 and the second side member 22, respectively. The intermediate segment 56 of the forward beam 24 may be elongated in the direction perpendicular to each of the first rocker 16 and the second rocker 18. In other words, the intermediate segment 56 of the forward beam 24 may be elongated in a cross vehicle direction, i.e., along the lateral axis A.

The intermediate segment 56 of the forward beam 24 may be fixed to both the first segment 52 and the second segment 54 of the forward beam 24. The intermediate segment 56 of the forward beam 24 may be fixed to each of the first segment 52 and the second segment 54 of the forward beam 24 in a same or different manner. The intermediate segment 56 of the forward beam 24 may be fixed to both the first segment 52 and the second segment 54 of the forward beam 24 in any suitable manner, e.g., welding, fastening, adhesive, etc.

The forward beam 24 may be fixed to both the first side member 20 and the second side member 22. Specifically, the first segment 52 of the forward beam 24 may be fixed to the first side member 20 and the second segment 54 of the forward beam 24 may be fixed to the second side member 22. The forward beam 24 may be fixed to both the first side member 20 and the second side member 22 in any suitable manner, e.g., welding, fastening, adhesive, etc.

The forward beam 24 may be fixed to the bulkhead 40. For example, the intermediate segment 56 of the forward beam 24 may be fixed to the bulkhead 40. The forward beam 24, e.g., the intermediate segment 56 of the forward beam 24, may be fixed to the bulkhead 40 in any suitable manner, e.g., welding, fastening, adhesive, etc.

The rearward beam 26 may be a mirror image of the forward beam 24 about the lateral axis A. As shown in FIG. 3, the rearward beam 26 may extend from one side 88 of the vehicle 12 to the other side 90 of the vehicle 12, i.e., along the lateral axis A. For example, the rearward beam 26 may extend from the first side member 20 to the second side member 22. Additionally, the rearward beam 26 may abut the cross member 42. The rearward beam 26 may be fixed to the cross member 42. The rearward beam 26 may be fixed to the cross member 42 in any suitable manner, e.g., welding, fastening, adhesive, etc.

The rearward beam 26 may have a convex shape from the first side member 20 to the second side member 22, i.e., towards the lateral axis A. For example, the first side member 20 and the second side member 22 may each be spaced from the cross member 42. In this situation, the rearward beam 26 may extend from the first side member 20 to the cross member 42 and from the second side member 22 to the cross member 42.

With reference to FIG. 3, the rearward beam 26 may include the first segment 58 extending from the first side member 20 at a non-perpendicular angle, and the second segment 60 extending from the second side member 22 at a non-perpendicular angle. The first segment 58 and the second segment 60 of the rearward beam 26 may each extend from the first side member 20 and the second side member 22, respectively, in directions transverse to each other. The first segment 58 may extend, for example, obliquely from the first side member 20 towards the cross member 42, and the second segment 60 may extend, for example, obliquely from the second side member 22 towards the cross member 42. In other words, the first segment 58 and the second segment 60 may extend from the first side member 20 and the second side member 22, respectively, towards each other, i.e., towards the longitudinal axis L. Each of the first segment 58 and the second segment 60 may extend at any suitable non-perpendicular angle from the first side member 20 and the second side member 22, respectively, towards the cross member 42.

With continued reference to FIG. 3, the rearward beam 26 may include the intermediate segment 62 extending from the first segment 58 to the second segment 60 of the rearward beam 26. Each of the first segment 58 and the second segment 60 of the rearward beam 26 may extend transversely from the intermediate segment 62 of the rearward beam 26. For example, the first segment 58 and the second segment 60 of the rearward beam 26 may each extend obliquely from the intermediate segment 62 of the rearward beam 26 to the first side member 20 and the second side member 22, respectively. The intermediate segment 62 of the rearward beam 26 may be elongated in the direction perpendicular to each of the first rocker 16 and the second rocker 18. In other words, the intermediate segment 62 of the rearward beam 26 may be elongated in a cross vehicle direction, i.e., along the lateral axis A.

The intermediate segment 62 of the rearward beam 26 may be fixed to both the first segment 58 and the second segment 60 of the rearward beam 26. The intermediate segment 62 of the rearward beam 26 may be fixed to each of the first segment 58 and the second segment 60 of the rearward beam 26 in a same or different manner. The intermediate segment 62 of the rearward beam 26 may be fixed to both the first segment 58 and the second segment 60 of the rearward beam 26 in any suitable manner, e.g., welding, fastening, adhesive, etc.

The rearward beam 26 may be fixed to both the first side member 20 and the second side member 22. Specifically, the first segment 58 of the rearward beam 26 may be fixed to the first side member 20 and the second segment 60 of the rearward beam 26 may be fixed to the second side member 22. The rearward beam 26 may be fixed to both the first side member 20 and the second side member 22 in any suitable manner, e.g., welding, fastening, adhesive, etc.

The rearward beam 26 may be fixed to the cross member 42. For example, the intermediate segment 62 of the rearward beam 26 may be fixed to the cross member 42. The rearward beam 26, e.g., the intermediate segment 62 of the rearward beam 26, may be fixed to the cross member 42 in any suitable manner, e.g., welding, fastening, adhesive, etc.

With continued reference to FIG. 3, the reinforcement 14 may include the flange 64 fixed to the rearward beam 26. Specifically, the flange 64 may be fixed to the intermediate segment 62 of the rearward beam 26. The flange 64 may extend along the lateral axis A from the first segment 58 to the second segment 60 of the rearward beam 26, i.e., along the intermediate segment 62 of the rearward beam 26. The flange 64 may be formed of any suitable material, e.g., steel, aluminum, etc.

With continued reference to FIG. 3, the flange 64 may extend outwardly from the rearward beam 26 along the longitudinal axis L to the cross member 42. The flange 64 may extend any suitable amount along the longitudinal axis L. For example, the flange 64 may extend across the cross member 42. Alternatively, the flange 64 may extend partially across the cross member 42. The flange 64 may be fixed to the cross member 42.

The flange 64 may be fixed to the rearward beam 26 and the cross member 42 in a same or different manner. The flange 64 may be fixed to both the rearward beam 26 and the cross member 42 in any suitable manner. For example, the flange 64 may be fixed to both the rearward beam 26 and the cross member 42 by welding. Alternatively, the flange 64 may be fixed to both the rearward beam 26 and the cross member 42 by fastening, adhesive, etc.

The reinforcement 14 may include the track 66 extending along the forward beam 24 and the rearward beam 26. The track 66 may be continuous and extend along the first side member 20 and the second side member 22. In other words, the track 66 may extend along the reinforcement 14. The track 66 may have any suitable form to support the seat assembly, as set forth below. One embodiment of the track 66 includes the groove 68, as set forth below. Another embodiment of the track 66 may include a rail (not shown) extending continuously along the reinforcement 14.

With reference to FIG. 3, the reinforcement 14 may include the inner wall 70 and the outer wall 72 spaced from the inner wall 70. The outer wall 72 may extend around the reinforcement 14, i.e., define a perimeter of the reinforcement 14. In other words, the outer wall 72 may be continuous and extend along each of the first side member 20, the second side member 22, the forward beam 24, and the rearward beam 26. The outer wall 72 may, for example, abut each of the first rocker 16, the second rocker 18, the bulkhead 40, and the cross member 42. The outer wall 72 may extend from the bottom 48 to the top 50 of the reinforcement 14.

The inner wall 70 may be enveloped by the outer wall 72. In other words, the inner wall 70 may be enclosed by outer wall 72. The inner wall 70 may be continuous and extend along each of the first side member 20, the second side member 22, the forward beam 24, and the rearward beam 26. The inner wall 70 may be, for example, spaced from each of the first rocker 16, the second rocker 18, the bulkhead 40, and the cross member 42 by the outer wall 72. The inner wall 70 may extend from the bottom 48 to the top 50 of the reinforcement 14.

The inner wall 70 and the outer wall 72 may define the groove 68 therebetween. The groove 68 may be continuous and extend along each of the first side member 20, the second side member 22, the forward beam 24, and the rearward beam 26. The groove 68 may extend in the direction D transverse to both the longitudinal axis L and the lateral axis A from the top 36 of the rocker towards the bottom 38 of the rocker. For example, the groove 68 may extend through the reinforcement 14 from the top 50 towards the bottom 48 of the reinforcement 14.

The reinforcement 14 may have any suitable shape. For example, the reinforcement 14 may be octagonal shaped, as shown in the Figures. As another example, the reinforcement 14 may be hexagonal shaped. In this situation, the first segment 52 and the second segment 54 of the forward beam 24 abut each other, and the first segment 58 and the second segment 60 of the rearward beam 26 abut each other. In other words, the intermediate segment 56 of the forward beam 24 and the intermediate segment 62 of the rearward beam 26 may be eliminated. Alternatively, the reinforcement 14 may have any other suitable shape, e.g., pentagonal, hexagonal, etc.

With reference to FIG. 2, the body 34 may include the floor 46 spaced from the underbody 44 in the direction D transverse to both the longitudinal axis L and the lateral axis A. For example, the floor 46 may be co-planar with the top 36 of the first rocker 16 and the top 36 of the second rocker 18. In other words, the floor 46 may extend from the top 36 of the first rocker 16 to the top 36 of the second rocker 18. Additionally, the floor 46 may extend from the bulkhead 40 to the cross member 42 along the longitudinal axis L.

The floor 46 may be formed of any suitable material. For example, the floor 46 may be formed of nylon. Alternatively, the floor 46 may be formed of cotton, vinyl, or any other suitable material. The floor 46 may include a backing (not shown) to support the occupant on the floor 46. The backing may be formed of any suitable material, e.g., foam, plastic, etc.

The floor 46 may be a single continuous unit, e.g., initially formed as a single piece of nylon. As another example, the floor 46 may include a plurality of segments, i.e., two or more, that are separately formed and subsequently attached together, e.g., by stitching.

The floor 46 may be attached to each rocker, i.e., the first rocker 16 and the second rocker 18. Additionally, the floor 46 may be attached to at least one of the bulkhead 40 and the cross member 42. For example, the floor 46 may be attached to each rocker and the cross member 42. The floor 46 may be attached to both rockers, i.e., the first rocker 16 and the second rocker 18, and at least one of the bulkhead 40 and the cross member 42 in any suitable manner, e.g., push pins, fasteners, adhesive, etc.

With continued reference to FIG. 2, the floor 46 may include a slot 74 extending through the floor 46 in the direction D transverse to both the longitudinal axis L and the lateral axis A. The slot 74 may include bristles (not shown) extending partially across the slot 74. The bristles may assist in preventing debris from passing through the slot 74.

The slot 74 may be continuous and may extend along the track 66 of the reinforcement 14. The slot 74 may, for example, extend along the floor 46 from the first rocker 16 to the second rocker 18, and from the bulkhead 40 to the cross member 42. The slot 74 may be adjacent the track 66, e.g., the groove 68, of the reinforcement 14. For example, the slot 74 may be disposed between the inner wall 70 and the outer wall 72 of the reinforcement 14, i.e., in the groove 68. The slot 74 may have the same shape as the reinforcement 14, e.g., octagon shaped.

With reference to FIG. 2, the vehicle structure 10 may include the plurality of seat assemblies 76 supported by the reinforcement 14. The seat assemblies 76 may be movably coupled to the track 66. For example, the seat assemblies 76 may be slideably engaged with the groove 68 of the reinforcement 14. In other words, the seat assemblies 76 may move relative to the track 66, as set forth below. The vehicle structure 10 may include any suitable number of seat assemblies 76, and the seat assemblies 76 may be arranged in any suitable arrangement.

With continued reference to FIG. 2, the seat assembly 76 may include a seat 78 having a seatback 80, a seat bottom 82, and a base 84. The seatback 80 may be supported by the seat bottom 82 and may extend upwardly from the seat bottom 82. The seatback 80 may be stationary or movable relative to the seat bottom 82. The seatback 80 and the seat bottom 82 may be adjustable in multiple degrees of freedom. Specifically, the seatback 80 and the seat bottom 82 may themselves be adjustable, in other words, may have adjustable components within themselves, and/or may be adjustable relative to each other. The base 84 may support the seat bottom 82 on the reinforcement 14. For example, the base 84 may extend from the seat bottom 82 to the track 66, e.g., the groove 68, of the reinforcement 14. In other words, the base 84 may extend through the slot 74 in the floor 46 from the seat bottom 82 to the reinforcement 14. The seat 78 may be any suitable type of seat, e.g., a bucket seat, a booster seat, a bench seat, etc.

The base 84 may be engageable with the track 66 of the reinforcement 14. The base 84 may be engageable with the track 66 of the reinforcement 14 in any suitable manner. The base 84 may, for example, include a tongue engageable with the groove 68. As another example, the base 84 may include a clamp slideably connectable to the track 66 of the reinforcement 14.

The seats 78 may be rotatable about the base 84. Specifically, the seats 78 may be rotatable to any selected position about the base 84, e.g., 180-360 degrees. The seats 78 may be independently rotatable to a position facing each other, as shown in FIG. 2. Alternatively, the seats 78 may be rotatable to a position facing away from each other, i.e., towards a steering wheel and/or towards the exterior environment.

The seat assembly 76 may include the motor 86 disposed on the track 66, e.g., in the groove 68, of the reinforcement 14. The motor 86 may movably couple the seat 78, i.e., the base 84, to the track 66, e.g., the groove 68, of the reinforcement 14. In other words, the motor 86 may be engaged with the seat 78 and the track 66 of the reinforcement 14. The motor 86 may move the seat 78 around the track 66 relative to the floor 46. In other words, the base 84 of the seat 78 may be moveable relative to the floor 46 of the vehicle 12, e.g., around the track 66, in a vehicle fore-and-aft direction, and/or a cross vehicle direction. The motor 86 may transfer movement between the seat 78 and the track 66 in any suitable fashion, e.g., the motor 86 may include a pinion engaged with teeth on the track 66, the motor 86 may include rollers abutting the inner wall 70 and the outer wall 72 of the track 66 to frictionally drive the seat 78, the motor 86 may include a magnet to drive the seat 78 through magnetic levitation, etc.

The motor 86 may be an electric motor. The motor 86 may be any suitable type of electric motor. For example, the motor 86 may be a brushless DC motor. Alternatively, the motor 86 may be a brushed DC motor, a rotary magnetic motor, or any other suitable type of electric motor.

Figure 4:
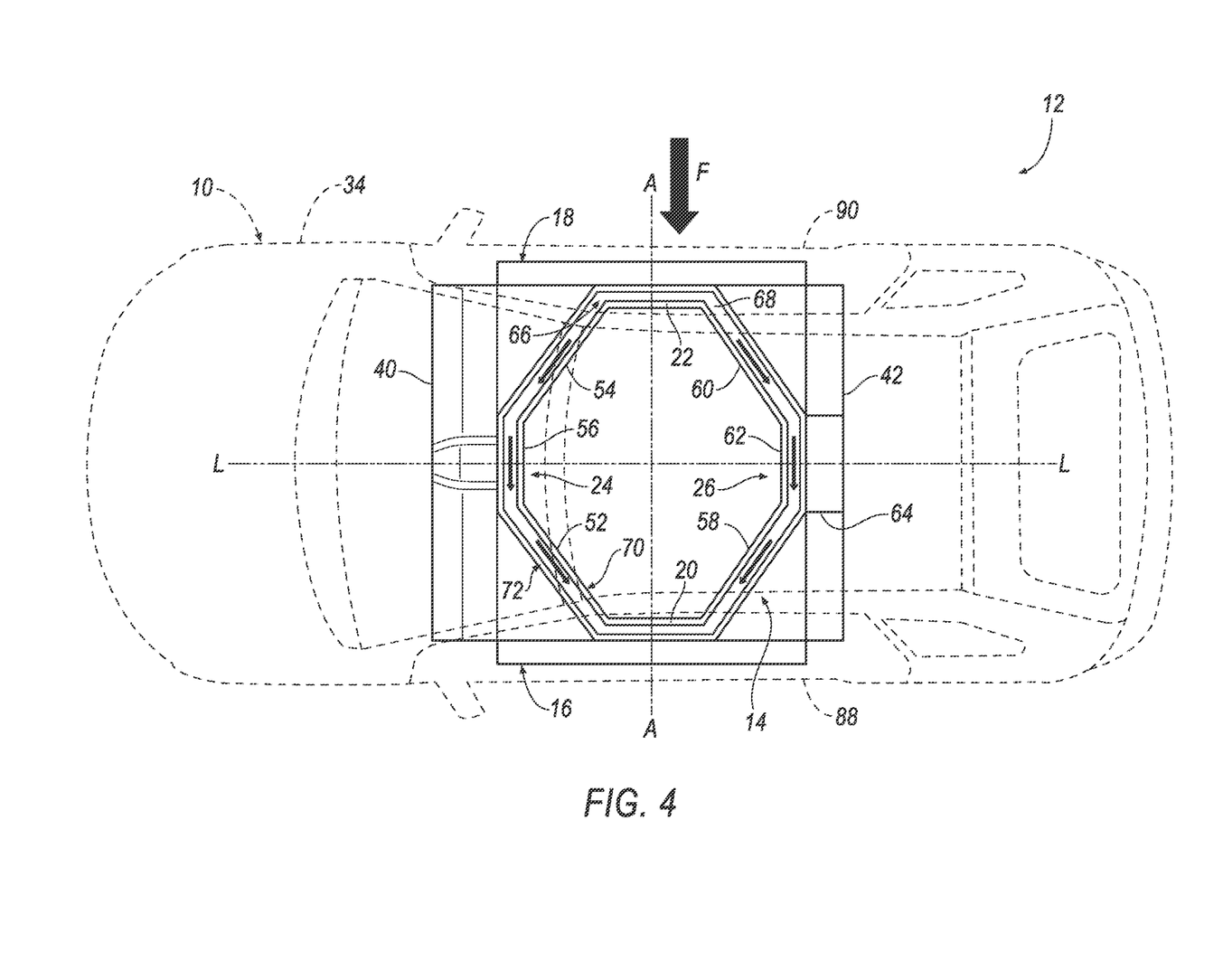
FIG. 4 is a top view of the vehicle showing a force distribution from the first rocker to the second rocker through the reinforcement when a force is applied along a lateral axis.

The reinforcement 14 may be subject to a force F during a vehicle impact. During a side impact one of the side members, i.e., the first side member 20 and the second side member 22, may be subjected to the force of the vehicle impact, as shown in FIG. 4. In this situation, the reinforcement 14 may distribute the force from one of the first side member 20 and the second side member 22 to the other components of the reinforcement 14. For example, the force may be distributed from the second rocker 18 and the second side member 22 to the first segment 52, 58 of both the forward beam 24 and the rearward beam 26. As another example, the force may be distributed from the first segment 52, 58 of both the forward beam 24 and the rearward beam 26 to the second segment 54, 60 of both the forward beam 24 and the rearward beam 26. In other words, the force may be split between the forward beam 24 and the rearward beam 26. In this situation, the force may be distributed through the intermediate segment 56, 62 of both the forward beam 24 and the rearward beam 26. The force distributed to the second segment 54, 60 of both the forward beam 24 and the rearward beam 26 may be distributed to the first side member 20 and the first rocker 16.

Figure 5:
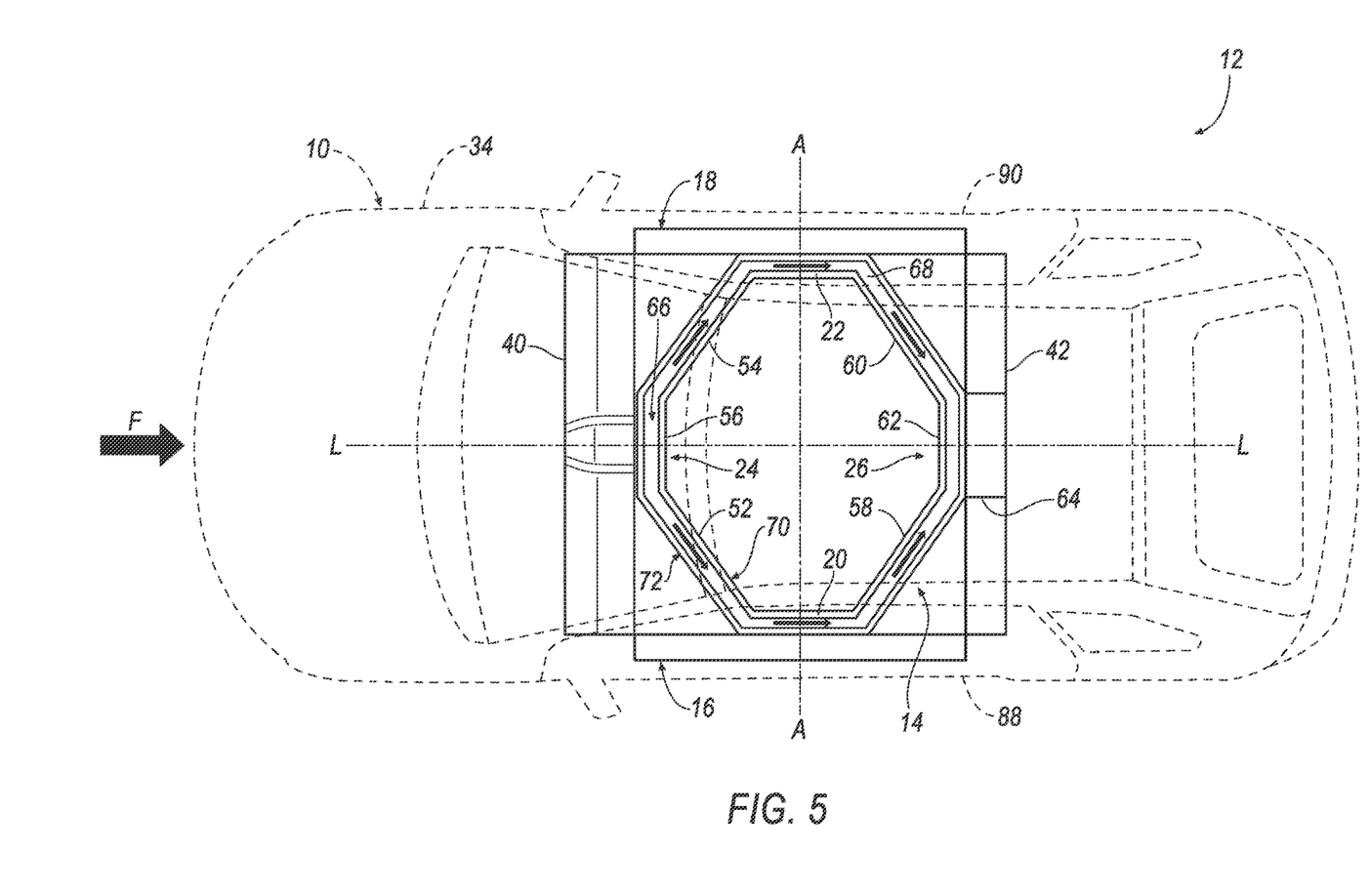
FIG. 5 is a top view of the vehicle showing a force distribution from a bulkhead to a cross member through the reinforcement when a force is applied along a longitudinal axis.

With reference to FIG. 5, during a frontal impact or a rear impact, one of the forward beam 24 and the rearward beam 26 may be subjected to the force of the vehicle impact. In this situation, the reinforcement 14 may distribute the force from one of the forward beam 24 and the rearward beam 26 to the other components of the reinforcement 14. For example, the force may be distributed from the intermediate segment 56 of the forward beam 24 to the first segment 52 and the second segment 54 of the forward beam 24. In other words, the force may be split between the first segment 52 and the second segment 54 of the forward beam 24. As another example, the force may be distributed from the first segment 52 of the forward beam 24 to the first side member 20, and from the second segment 54 of the forward beam 24 to the second side member 22. In this situation, the force may be distributed from each of the first side member 20 and the second side member 22 to the first segment 58 and the second segment 60 of the rearward beam 26, respectively. The force distributed to the first segment 58 and the second segment 60 of the rearward beam 26 may be distributed to the intermediate segment 62 of the rearward beam 26 and the cross member 42.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle structure comprising:
a first rocker and a second rocker spaced from the first rocker; and
a reinforcement having a forward beam and a rearward beam spaced from each other;
the reinforcement including a first side member and a second side member each extending from the forward beam to the rearward beam, the first side member abutting the first rocker, and the second side member abutting the second rocker;
wherein the forward beam includes a first segment extending from the first side member at a non-perpendicular angle, and a second segment extending from the second side member at a non-perpendicular angle, the first segment and the second segment each extending from the first side member and the second side member, respectively, in directions transverse to each other.

2. The vehicle structure of claim 1, wherein the first side member is elongated along the first rocker, and the second side member is elongated along the second rocker.

3. The vehicle structure of claim 1, wherein the first side member is fixed to the first rocker, and the second side member is fixed to the second rocker.

4. The vehicle structure of claim 1, further comprising a bulkhead and a cross member spaced from each other and each extending from the first rocker to the second rocker, wherein the forward beam abuts the bulkhead and the rearward beam abuts the cross member.

5. The vehicle structure of claim 4, wherein the reinforcement includes a flange fixed to the rearward beam, the flange extending across the cross member.

6. The vehicle structure of claim 5, wherein the flange is fixed to the cross member.

7. The vehicle structure of claim 1, further comprising an underbody extending from the first rocker to the second rocker, and a floor, the reinforcement being between the underbody and the floor.

8. The vehicle structure of claim 7, wherein the reinforcement abuts the underbody and is fixed to the underbody.

9. The vehicle structure of claim 1, wherein the forward beam and the rearward beam each have a convex shape from the first side member to the second side member.

10. The vehicle structure of claim 9, wherein the rearward beam is a mirror image of the forward beam.

11. The vehicle structure of claim 1, wherein the forward beam includes an intermediate segment extending from the first segment to the second segment, each of the first segment and the second segment of the forward beam extending transversely from the intermediate segment.

12. The vehicle structure of claim 11, wherein the intermediate segment is elongated in a direction perpendicular to the first rocker and the second rocker.

13. The vehicle structure of claim 1, wherein the reinforcement includes a track extending along the forward beam and the rearward beam, and further comprising a seat assembly supported by the reinforcement and moveably coupled to the track.

14. The vehicle structure of claim 13, further comprising a motor moveably coupling the seat assembly and the track.

15. The vehicle structure of claim 13, wherein the track is continuous and extends along the first side member and the second side member.

16. The vehicle structure of claim 1, wherein the reinforcement includes an inner wall and an outer wall spaced from the inner wall, the inner wall and the outer wall defining a groove therebetween, and further comprising a seat assembly supported by the reinforcement and slideably engaged with the groove.

17. The vehicle structure of claim 1, further comprising a first pillar and a second pillar spaced from each other and defining a door opening therebetween, the door opening sized to receive a front door and a rear door.

18. The vehicle structure of claim 17, wherein the reinforcement is disposed between the first pillar and the second pillar.

19. The vehicle structure of claim 1, further comprising a first pillar and a second pillar spaced from each other, the reinforcement disposed between the first pillar and the second pillar.

20. A vehicle structure comprising:
a first rocker and a second rocker spaced from the first rocker; and
a reinforcement having a forward beam and a rearward beam spaced from each other;
the reinforcement including a first side member and a second side member each extending from the forward beam to the rearward beam, the first side member abutting the first rocker, and the second side member abutting the second rocker;
wherein the reinforcement includes a track extending along the forward beam and the rearward beam, and further comprising a seat assembly supported by the reinforcement and moveably coupled to the track; and
wherein the track is continuous and extends along the first side member and the second side member.

21. A vehicle structure comprising:
a first rocker and a second rocker spaced from the first rocker; and
a reinforcement having a forward beam and a rearward beam spaced from each other;
the reinforcement including a first side member and a second side member each extending from the forward beam to the rearward beam, the first side member abutting the first rocker, and the second side member abutting the second rocker;
wherein the reinforcement includes an inner wall and an outer wall spaced from the inner wall, the inner wall and the outer wall defining a groove therebetween, and further comprising a seat assembly supported by the reinforcement and slideably engaged with the groove.

* * * * *